(12) United States Patent
Schiel

(10) Patent No.: US 9,096,205 B2
(45) Date of Patent: Aug. 4, 2015

(54) BRAKE SYSTEM AND METHOD FOR OPERATING SAME

(75) Inventor: Lothar Schiel, Hofheim (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 93 days.

(21) Appl. No.: 13/876,879

(22) PCT Filed: Sep. 29, 2011

(86) PCT No.: PCT/EP2011/066995
§ 371 (c)(1),
(2), (4) Date: Mar. 29, 2013

(87) PCT Pub. No.: WO2012/045656
PCT Pub. Date: Apr. 12, 2012

(65) Prior Publication Data
US 2013/0187441 A1 Jul. 25, 2013

(30) Foreign Application Priority Data

Oct. 4, 2010 (DE) .......................... 10 2010 041 911
Sep. 22, 2011 (DE) .......................... 10 2011 083 237

(51) Int. Cl.
*B60T 11/28* (2006.01)
*B60T 7/04* (2006.01)
(Continued)

(52) U.S. Cl.
CPC ................ *B60T 11/28* (2013.01); *B60T 7/042* (2013.01); *B60T 8/4081* (2013.01); *B60T 13/662* (2013.01); *B60T 13/686* (2013.01)

(58) Field of Classification Search
CPC ..... B60T 7/042; B60T 13/662; B60T 8/4081; B60T 11/28; B60T 13/686; B60T 13/745
USPC ............ 303/3, 6.01, 20, 113.4, 114.1, 115.2; 188/358, 359
See application file for complete search history.

(56) References Cited

U.S. PATENT DOCUMENTS 6,158,825 A * 12/2000 Schunck et al. ........... 303/115.4
6,354,673 B1 * 3/2002 Feigel et al. ............... 303/113.4
(Continued)

FOREIGN PATENT DOCUMENTS

CN 1419505 A 5/2003
DE 196 40 767 A1 4/1998
(Continued)

OTHER PUBLICATIONS

PCT International Search Report—Jul. 19, 2012.
(Continued)

*Primary Examiner* — Thomas J Williams
*Assistant Examiner* — Mariano Sy
(74) *Attorney, Agent, or Firm* — Brinks Gilson & Lione

(57) ABSTRACT

A brake system for motor vehicles of "brake-by-wire" type without a brake booster, having a hydraulic activation device which can be activated by means of a brake pedal and to which wheel brakes are connected, and a simulation device which can be activated hydraulically and has at least one elastic element which gives the driver of a vehicle a pleasant pedal sensation is intended to have a functional capacity which can be checked during the normal braking function and to give the driver a pedal sensation which is familiar from a conventional hydraulic brake system. For this purpose, the activation device is connected via a hydraulic connection to the simulation device, wherein the hydraulic connection is connected via an electrically controllable check valve to a pressure medium reservoir which is at atmospheric pressure.

13 Claims, 1 Drawing Sheet

(51) Int. Cl.
  *B60T 13/66* (2006.01)
  *B60T 13/68* (2006.01)
  *B60T 8/40* (2006.01)

(56) References Cited

U.S. PATENT DOCUMENTS

| | | | |
|---|---|---|---|
| 7,014,277 B2* | 3/2006 | Soga | 303/122 |
| 7,488,047 B2* | 2/2009 | Hatano et al. | 303/122.09 |
| 7,651,176 B2* | 1/2010 | Inoue et al. | 303/114.1 |
| 8,010,269 B2* | 8/2011 | Toyohira et al. | 701/70 |
| 8,322,800 B2* | 12/2012 | Anderson et al. | 303/114.3 |
| 8,328,297 B2* | 12/2012 | Hatano | 303/115.1 |
| 2007/0216218 A1* | 9/2007 | Matsushita et al. | 303/20 |
| 2012/0043806 A1* | 2/2012 | Linkenbach et al. | 303/113.1 |

FOREIGN PATENT DOCUMENTS

| | | |
|---|---|---|
| DE | 10 2008 001 061 A1 | 10/2009 |
| DE | 10 2009 024 034 A1 | 8/2010 |
| DE | 10 2010 042 694 A1 | 2/2012 |
| EP | WO 2009/003781 A2 | 1/2009 |
| EP | WO 2009/121645 A1 | 10/2009 |

OTHER PUBLICATIONS

German Examination Report—Dec. 19, 2012.

* cited by examiner

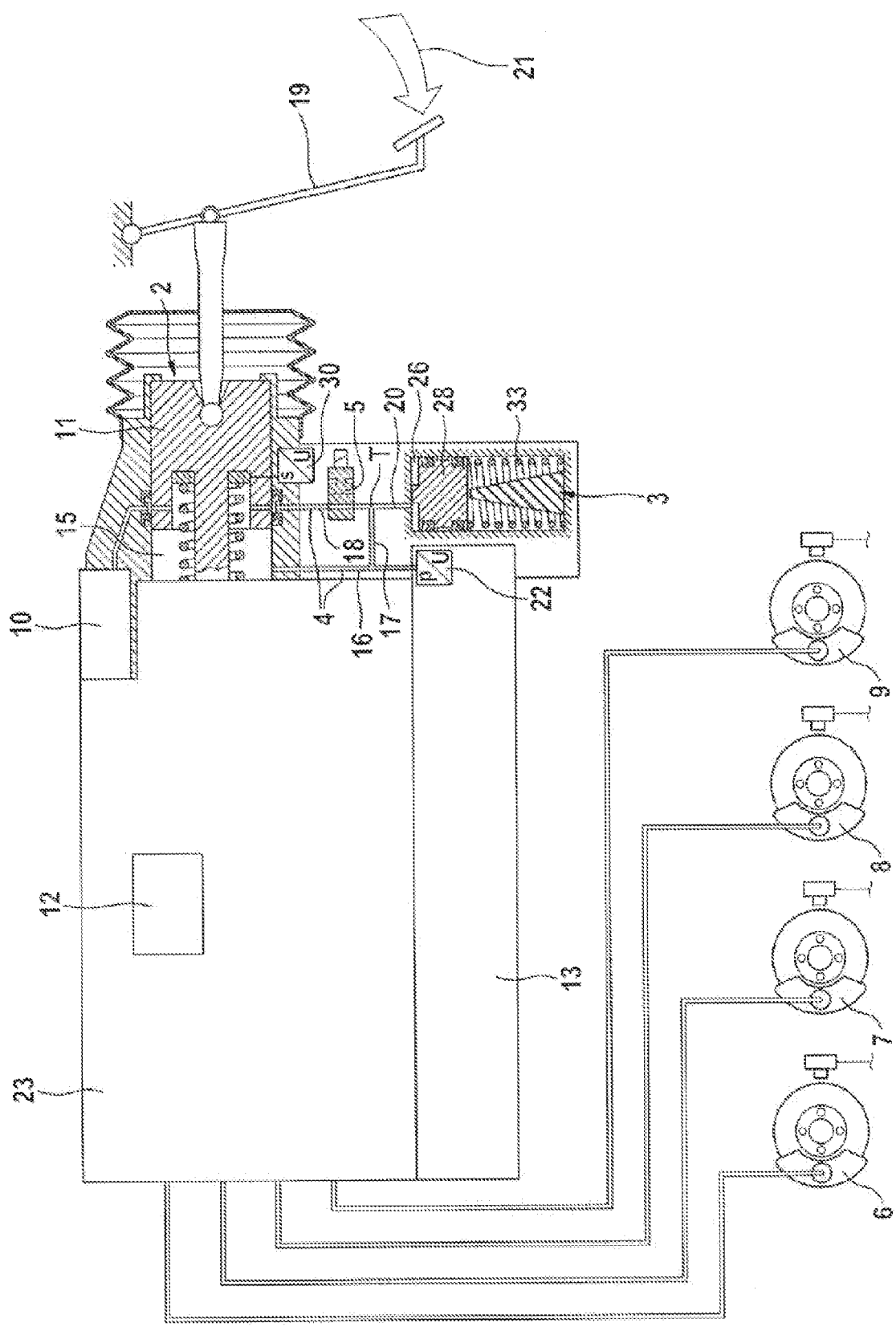

BRAKE SYSTEM AND METHOD FOR OPERATING SAME

CROSS-REFERENCE TO RELATED APPLICATIONS

This application claims priority to German Patent Application Nos. 10 2010 041 911.7, file Oct. 4, 2010; 10 2011 083 237.8, filed Sep. 22, 2011; and PCT/EP2011/066995, filed Sep. 29, 2011.

FIELD OF THE INVENTION

The invention relates to a brake system of the "brake-by-wire" type for motor vehicles, in particular a brake system that does not have a brake power assist unit, having a hydraulic actuating device that can be actuated by means of a brake pedal, to which hydraulic actuating device are connected wheel brakes, and a simulation device that can be actuated hydraulically and comprises at least an elastic element that conveys a comfortable pedal sensation to the vehicle driver. The invention further relates to a method for operating a brake system of this type.

BACKGROUND OF THE INVENTION

"Brake-by-wire" brake systems are being used ever more frequently in automotive technology. In the case of these brake systems, the brake can be "independently" actuated on the basis of electronic signals without any active input on the part of the vehicle driver. These electronic signals can, for example, be emitted by an electronic stability program ESC or an adaptive cruise control ACC. In addition, if a braking effect that is requested by the vehicle driver by way of a brake pedal actuating force is achieved, for example, by switching an electric vehicle drive into a generator operation, it is possible to omit fully or partially an actuation of the brake system.

Brake systems and/or braking systems of this type that are embodied in an electrohydraulic manner usually comprise in addition to the hydraulic actuating device a simulation device into which brake fluid and/or a pressure medium is directed from the actuating device as the brake pedal is actuated. The simulation device in this case usually comprises an elastic simulator element, for example a spring, that is stressed as the pressure medium is introduced, for example by way of a piston that can be moved as a result of the pressure medium being introduced. It is possible in this manner on the one hand to achieve a reproducible relationship between the pedal travel and the braking torque. On the other hand, an attempt is made thereby to convey to the driver a pedal sensation that is known from conventional hydraulic brake systems. The processes of designing and constructing a pedal travel simulator of this type represent a complex challenge.

The object of the present invention is to provide a vehicle brake system of this type, the operational reliability of which can be tested during the normal brake function and which vehicle brake system conveys to the driver a pedal sensation known from conventional hydraulic brake systems. In particular, the pedal sensation is to be improved with respect to known brake systems of this type. Furthermore, a method for operating a brake system of this type is to be provided.

INTRODUCTORY DESCRIPTION OF THE INVENTION

With regard to the braking system, this object is achieved in accordance with the invention, by virtue of the fact that the actuating device is connected or can be connected by way of a hydraulic connection to the simulation device, wherein the hydraulic connection is connected by way of an electrically controllable shut-off valve to a pressure medium container that is in particular subjected to atmospheric pressure.

Advantageous embodiments of the invention are described in this specification and appended drawing figures.

The invention is based on the consideration that known solutions, in which pressure medium is discharged into the simulation device immediately as the brake pedal is actuated, cannot convey sufficiently a pedal sensation as is known from conventional hydraulic power-assisted brake systems that comprise vacuum-assisted power brake units. In the case of brake systems of this type, namely in a comfort range of up to approximately 25 mm to 30 mm brake pedal travel, an increase in force that is discernible by the driver is to all intents and purposes no longer necessary after overcoming the response force of the brake power assist unit in order to achieve a brake application of up to 0.3 g deceleration. In this range, namely the so-called "Springer" or rather the "Springer function" takes effect. The brake actuation is in this case conducted to all intents and purposes entirely by the brake power assist unit; the driver is merely required to activate the pneumatic booster valve by means of actuating the pedal.

If the simulation device is then immediately actuated, the driver experiences quite a high level of resistance due to the frictional resistance and the positive (increasing) spring constant of the (spring type) simulator element. The pedal sensation produced as a result thereof differs greatly from the comfortable sensation that the driver is accustomed to from the mentioned power-assisted brake systems. Due to the increased resistance, the driver can also be misled in dangerous situations into not actuating the brake pedal sufficiently rapidly and/or sufficiently forcefully.

Henceforth, a pedal sensation that is known from the above described power-assisted brake systems can be achieved in a brake-by-wire system having a simulation device or rather having a simulator by virtue of the fact that a hydraulic connection of the actuating device to the storage container and/or to the pressure medium container is provided, which connection can be disconnected if required. This embodiment renders it possible for this connection to remain open during a predetermined pedal travel so that pressure medium is conveyed into the storage container and due to the (spring-like and friction-like) resistances of the simulator components is not discharged into the simulator so that the piston in the travel simulator is not actuated and no resistance is exerted on the brake pedal by means of the spring element. As a consequence, a flat pedal travel/force characteristic curve comparable to the Springer function can be achieved.

It is preferred that the brake system in a so-called brake-by-wire operating mode can be controlled either by the driver or independently from the vehicle driver, said brake system is preferably normally operated in the "brake-by-wire" operating mode and can be operated in at least a fall-back operating mode in which only the operation by means of the driver is possible.

The shut-off valve is advantageously embodied as a de-energized open (normally open) electrically controllable valve. This means that in the de-energized state, the hydraulic connection between the actuating device and the pressure medium container is open. In this manner, it is possible in the event of a failure of the power supply to prevent that the pressure medium flows into the simulator and is no longer available in the fall-back level.

The actuation device advantageously comprises a pressure chamber for pressure medium that is conveyed into the hydraulic connection as the brake pedal is actuated. This pressure chamber is preferably hydraulically connected to the pressure medium container in such a manner that, in the case of a completely disengaged brake pedal, said pressure chamber is still hydraulically connected to the pressure medium container but this connection can be disconnected as the brake pedal is actuated.

For the purpose of sensing the actuation travel of the brake pedal, the actuation device advantageously comprises a sensor in particular a travel sensor that is preferably embodied in a redundant manner. Due to the hydraulic connection provided to the storage container, it is not possible or only possible to an extremely limited extent to use a pressure sensor for this purpose. However, the sensor can additionally be provided for sensing the brake request in the case of a connected simulation device.

In a preferred embodiment, the brake system is embodied in such a manner that the simulation device is only connected after the shut-off valve is closed. Prior to the shut-off valve being closed, the driver only senses in this manner an insignificant amount of opposing pressure from the pedal. In this case, the shut-off valve can be closed after a pedal travel of approx. 25 to 30 mm. The opposing pressure that is produced by the simulator can then only be felt during longer pedal travel distances in a range of heavy brake applications in which the greater opposing pressure does not negatively influence the driver.

The brake system advantageously comprises for the brake-by-wire operation an electrically controllable pressure supplying device which—taking into consideration the braking request issued by the driver—can build up braking pressure in the wheel brakes.

The pressure supplying device is advantageously embodied by a cylinder-piston arrangement whose piston can be actuated by means of an electromechanical actuator. The pressure medium is advantageously displaced by the piston out of the pressurized chamber into the wheel brakes.

Outside the "brake-by-wire" operating mode, in other words in the fall-back operating mode, the simulation device is preferably switched to the no-pressure state, so that the entire pressure medium is available for braking the vehicle.

With regard to the method for operating a brake system, the above mentioned object is achieved in accordance with the invention by virtue of the fact that as the brake pedal is actuated, in particular in the "brake-by-wire" operating mode, the shut-off valve is only switched into its closed switch position if the actuating travel of the brake pedal exceeds a predetermined limit value. The limit value is advantageously predetermined in dependence upon the driving situation, in other words dynamically.

The advantages of the invention reside in the fact that by virtue of a hydraulic connection between the actuation unit and the simulator, which is connected in a separable manner to the pressure medium container, a pedal sensation similar to that of the Springer behavior can be achieved. An advantage of the invention is thus to provide the non-assisted simulator actuation with an ergonomically optimized pedal characteristic that is extremely similar to the conventional "Springer behavior".

By virtue of the connection to the pressure medium container being disconnected after a predetermined pedal travel, the driver experiences very little resistance up to this position of the pedal, so that it is possible to simulate the pedal sensation of power-assisted brake systems that have a vacuum-assisted power brake assist unit. In addition, the function of the shut-off valve can be tested during the normal braking function without irritating the driver. This connection that is relevant for safety can be tested for its operational reliability by means of the system during each pedal actuation.

The braking request from the driver can be sensed in a precise manner by means of sensing the pedal travel with the aid of a travel sensor that is preferably embodied in a redundant manner.

BRIEF DESCRIPTION OF THE DRAWINGS

An exemplary embodiment of the invention is explained in detail with reference to FIG. 1. The drawing schematically illustrates an exemplary embodiment of a brake system having a pedal sensation simulator.

ADDITIONAL DETAILED DESCRIPTION OF THE INVENTION

The electrohydraulic brake system in accordance with the example and illustrated in FIG. 1 comprises an actuation device 2 having a tandem master brake cylinder, a simulation device 3, a "by-wire" system 23 that is connected to the actuation device 2 and comprises a wheel brake pressure modulation device (not illustrated) and an electrically controllable pressure supplying device 12, and an electronic control unit (ECU) 13. Wheel brakes 6, 7, 8 and 9 are connected to the wheel brake pressure modulation unit. The hydraulic actuation device 2 can be actuated by way of a brake pedal 19 and comprises at least an actuating piston 11 and a pressure chamber 15. The actuating travel of the brake pedal 19 is sensed by means of a travel sensor 30 that is preferably embodied in a redundant manner and senses for example the travel of the piston 11, and consequently is used to detect the driver's request and/or to generate a desired value in the electronic control unit 13.

The simulation device 3 represents a hydraulically actuated pedal sensation simulator and comprises in accordance with the example an elastic element 33 (e.g. a simulator spring) and a piston 28 that represents a boundary of a hydraulic chamber 26 and into which the pressure medium can be conveyed, for example as the brake pedal 19 is actuated.

The illustrated brake system is embodied as a "brake-by-wire" system. The electrohydraulic pressure supplying device 12 is designed to build up the wheel brake pressure in the "brake-by-wire" operation. The electrohydraulic pressure supplying device 12 advantageously comprises essentially a hydraulic cylinder-piston arrangement and an electromechanical actuator that is embodied for example by an electric motor having reduction gearing that ensures a translatory movement of a hydraulic piston, so that a hydraulic pressure builds up in a pressure chamber of the hydraulic cylinder-piston arrangement. The electromechanical actuator is supplied with energy from an electrical energy storage unit. The movement of the piston will be sensed indirectly by means of at least one angle of rotation sensor that senses the rotor position of the electromechanical actuator. The pressure chamber can be connected to the wheel brakes 6 to 9.

In "brake-by-wire" brake systems, the required brake pressure when applying the service brake without the direct input from the driver is provided by a pneumatic electric and/or electrohydraulic actuation unit. The pedal sensation known from conventional brake systems is conveyed to the driver in systems of this type by means of a simulation device and/or the so-called travel simulator. The processes of designing and constructing a pedal travel simulator of this type represent a complex challenge since it is intended that the travel simulator as far as possible simulates a travel-force characteristic curve of the brake pedal of a conventional power-assisted brake system that has a vacuum-assisted power brake unit.

The range of the pedal travel up to approx. 35 to 40 mm, in which the predominant number of all the brake applications occur during the life of a vehicle, is decisive for the appropriate control of the brake and for the comfortable sensation of the driver. In a brake system that uses a vacuum-assisted power brake unit, an increase in force that is discernible by the driver is to all intents and purposes no longer necessary after overcoming the response force in order to achieve a brake application of up to 0.3 g deceleration. In this range, the so-called "Springer" function takes effect. In this case, the brake actuation is to all intents and purposes performed by the brake power assist unit and the driver merely has to activate the pneumatic pressure booster valve by actuating the pedal.

The illustrated brake system is embodied for the purpose of simulating and/or providing the "Springer"-like pedal sensation of these power-assisted brake systems. For this purpose, the actuation device 2 is connected by way of a hydraulic connection 4 to the simulation device 3. The hydraulic connection 4 comprises a line section 16 that issues from the pressure chamber and is connected to a line section 17. The line section 17 branches out from a T-shaped branching point T into a line section 20, which connects into the hydraulic chamber 26, and into a line section 18, which is hydraulically connected to the pressure medium container 10. A preferably de-energized open (normally open) hydraulic valve 5 is connected into the line section 18, which valve in the connected, i.e. closed state, disconnects the connection to a pressure medium container 10 that is in particular subjected to atmospheric pressure. A pressure sensor 22 is provided for determining the pressure prevailing in the hydraulic connection 4.

When applying a brake in the case of a functional "by wire" brake system, the NO-activation valve 5 (NO: normally open) is closed only after a defined pedal travel has been performed. A build-up of pressure in the hydraulic simulator actuation circuit and an activation of the actual simulator and/or the simulation device 3 are only possible after this point. Prior to the valve 5 closing, which is controlled by the electronic control unit 13, pressure medium flows out of the pressure chamber 15 essentially by way of the line sections 16, 17, 18 of the hydraulic connection 4 into the pressure medium container 10. Only after the valve 5 that is embodied as a shut-off valve is closed is pressure medium conveyed into the simulation device 3 and the elastic element 33 stressed, wherein the driver then senses an increase in the opposing force on the brake pedal 19 in comparison to previously. In this manner, in the case of functional "by wire" brake systems, the simulated pedal characteristic in the first range of the pedal travel (up to approximately 30% braking deceleration) is maintained extremely flat (minimal increase in force over the pedal travel).

It is possible, by means of permanently sensing the pedal travel with the aid of the travel sensor 30 and the hydraulic pressure in the simulation circuit with the aid of the pressure sensor 22, to monitor the device each time the driver actuates the brake. The valve 5 is advantageously controlled in a cyclic manner after a predetermined pedal travel prior to said valve then being completely closed. If this occurs in the space of a few milliseconds, which is readily possible in the case of modern valves, the driver does not sense these cycles. A predetermined pedal travel/force characteristic curve can also be implemented in this manner by means of controlling the valve 5 in a purposeful and cyclic manner.

It is possible during the normal operation to recognize with the aid of the pressure sensor 22 without any additional test cycles if the NO-valve 5 has been incorrectly closed. Furthermore, it is also possible during a brake application in the case of the open valve 5 to test the functionality of said valve without adversely affecting the driver. For this purpose, the valve 5 is closed within a short period of time, preferably within a few milliseconds, and then reopened. This procedure can also be performed numerous times one after the other. Pressure variations occur in the simulation circuit as a result of closing the valve 5 for a short period of time, i.e. also in the hydraulic connection 4, which pressure variations can be sensed by means of the pressure sensor 22 and diagnosed with the aid of the state of the valve 5.

In the case of the "by wire" brake system (independently-assisted power brake system) illustrated in the FIGURE it is intended to represent the above described pedal behavior of a conventional power-assisted brake system that has a vacuum-assisted power brake system having a simulator that does not have a brake power assist unit. In this case, as the driver actuates the pedal 19 in the actuation direction 21, an actuation piston 11, which is pre-stressed by means of a resilient force and is sealed by means of hydraulic seals, and a simulation device 3, which is likewise pre-stressed in a resilient manner and comprises hydraulic seals, are both moved. These structural elements have by nature a frictional resistance and a positive (increasing) spring rate. In order to represent the Springer function, the valve 5 is only opened after a predetermined pedal travel has been covered, so that the pedal travel/force characteristic curve is extremely flat during this pedal travel. Only then is the shut-off valve 5 closed, which can occur in a pulsed manner. As a consequence, an increasing pedal travel/force characteristic curve is represented.

Since the simulator and/or the simulation device 3 is only used in the increasing portion of the pedal travel/force characteristic curve, said simulator and/or simulation device can be manufactured in a simple manner. In particular, it is not necessary to provide an elastic element 33 having a progressively changeable spring rate.

While the above description constitutes the preferred embodiment of the present invention, it will be appreciated that the invention is susceptible to modification, variation and change without departing from the proper scope and fair meaning of the accompanying claims.

The invention claimed is:

1. A brake system of a brake-by-wire type for motor vehicles, comprising a hydraulic actuation device that can be actuated by means of a brake pedal, to which actuation device are connected a plurality of wheel brakes, and having a hydraulically actuated simulation device having at least an elastic element that conveys to the vehicle driver a comfortable pedal sensation, the actuation device connected by way of a hydraulic connection to the simulation device, wherein the hydraulic connection is connected by way of an electrically controllable shut-off valve to a pressure medium container that is subjected to atmospheric pressure wherein the simulation device is only connected with the brake pedal after the shut-off valve is closed.

2. The brake system as claimed in claim 1, wherein the shut-off valve is in the form of a normally open electrically controllable valve.

3. The brake system as claimed in claim 1, wherein the actuation device further comprises a pressure chamber for pressure medium that is conveyed into the hydraulic connection as the brake pedal is actuated.

4. The brake system as claimed in claim 1, wherein the actuation device further comprises a travel sensor for sensing an actuation travel of the brake pedal.

5. The brake system as claimed in claim 1, wherein the brake system further comprises an electrically controllable pressure supplying device.

6. The brake system as claimed in claim 5, wherein the pressure supplying device is provided in the form of a cylinder-piston arrangement, the piston of which can be actuated by means of an electromechanical actuator.

7. The brake system as claimed in claim 1, wherein outside of a brake-by-wire operating mode and in a fall-back operating mode, the simulation device is switched to a no-pressure state, where the entire pressure medium is available for braking the vehicle.

8. The brake system as claimed in claim 1, wherein the electrically controllable shut-off valve is operated based upon a degree of actuation displacement of the brake pedal.

9. The brake system as claimed in claim 1, wherein as the brake pedal is actuated in a brake-by-wire operating mode, the shut-off valve is switched into a closed switch position if the actuating travel of the brake pedal exceeds a predetermined limit value.

10. A method for operating a brake system for motor vehicles comprising; providing a hydraulic actuation device that can be actuated by means of a brake pedal, to which actuation device are connected a plurality of wheel brakes, and having a hydraulically actuated simulation device having at least an elastic element that conveys to the vehicle driver a comfortable pedal sensation, the actuation device connected by way of a hydraulic connection to the simulation device, wherein the hydraulic connection is connected by way of an electrically controllable shut-off valve to a pressure medium container that is subjected to atmospheric pressure, in that as brake pedal is actuated and when the system is in a brake-by-wire operating mode, switching the shut-off valve into a closed switch position if the actuating travel of the brake pedal exceeds a predetermined limit value.

11. The method as claimed in claim 10 further comprising setting the predetermined limit value in dependence upon the driving situation.

12. A brake system of a brake-by-wire type for motor vehicles, comprising a hydraulic actuation device that can be actuated by means of a brake pedal, to which actuation device are connected a plurality of wheel brakes, and having a hydraulically actuated simulation device having at least an elastic element that conveys to the vehicle driver a comfortable pedal sensation, the actuation device connected by way of a hydraulic connection to the simulation device, wherein the hydraulic connection is connected by way of an electrically controllable shut-off valve to a pressure medium container that is subjected to atmospheric pressure, wherein the hydraulic connection includes a first line section that extends from the actuation device, the first line section branching into a second line section that connects to the simulation device and into a third line section that connects to the pressure medium container;

wherein the simulation device is enabled and fluid flows into the simulation device through the second line section when the shut-off valve is in a closed position.

13. The brake system as claimed in claim 12, wherein the shut-off valve is connected into the third line section.

* * * * *